Patented Sept. 17, 1935

2,014,519

UNITED STATES PATENT OFFICE 2,014,519

ARGENTO-CHROME TETRAMETHYLTHIONIN AND PROCESS OF MANUFACTURE

David Julian Block, Chicago, Ill., assignor to Mrs. Frank Beecher, Brockville, Ontario, Canada No Drawing. Application January 16, 1933, Serial No. 652,019

4 Claims. (Cl. 260—11)

This invention relates to a compound and a process for manufacturing the same, and more particularly to argento-chrome tetramethylthionin, a chemical compound having therapeutic and antiseptic properties of particular value in dentistry and surgery.

I am aware that many metallic salts have been used because of their antiseptic properties, those of silver, mercury, bismuth and zinc being frequently encountered in the prior art. The germicidal activity in many of these metallic salts, when acting upon bacteria suspended in pure water, is extraordinarily high but this powerful action is enormously reduced as soon as the bacteria are placed in other media than pure water. Most of the soluble salts of these metals, with the possible exception of some colloid preparations, have the disadvantage that they are precipitated by proteins or other constituents of wound exudates so that their high initial antiseptic potency is soon reduced.

Your applicant has sought to overcome the foregoing difficulties and the product herein described differs from the action of most metallic salts in that the argento-chrome tetramethylthionin is readily dissociated in contact with the tissues.

My product is usually dissolved in alcohol, glycerol, or a mixture of the two, and when injected into the tissues or applied on the surface by means of a spray is surprisingly non-irritating, considering the high concentration of the silver and chromium salts.

In preparing my new compound I may proceed as follows: 200 cubic centimeters $$\frac{N}{8}$$

silver nitrate solution is run into a 500 cc. Florence flask, in which is dissolved one gram of the double zinc salt of tetramethylthionin. The mixture is now faintly acidulated with acetic acid and warmed on the water bath to approximately 85° C. When the foregoing temperature is attained 50 cc. of a saturated aqueous solution of potassium dischromate (approximately 10% potassium dichromate) is slowly run into the mixture, the warm mixture being constantly agitated throughout the process. When all of the dichromate solution has been added, the compound is allowed to digest on the water bath at a temperature of 85° C. for approximately one-half hour whereupon the silver-chromium double salt of tetramethylthionin is precipitated after which it is filtered and repeatedly washed with cold water containing one gram of ammonium chloride to the liter, until the wash waters are no longer colored yellow, whereupon the precipitate is dried, redissolved in warm ethyl alcohol, filtered, and the solution evaporated to dryness.

The argento-chrome tetramethylthionin thus obtained is in the form of an amorphous, reddish brown to purplish scale or powder having a bronzy, metallic luster, and which is readily soluble in ammonia hydroxide, dilute nitric acid, hot glycerol, hot potassium iodide, warm alcohol, and warm acetone and has the following approximate percent composition: 21.33% silver, 10.31% chromium, 11.11% oxygen and 57.25% tetramethylthionin. It is sparingly soluble in water, carbon tetrachloride, benzol, paraffin oil, and petrolatum. It is not precipitated from solution by chlorides, but it is thrown down as a canary yellow, curdy precipitate by lead acetate. It is not decolorized by reducing agents, and has the following probable formula:

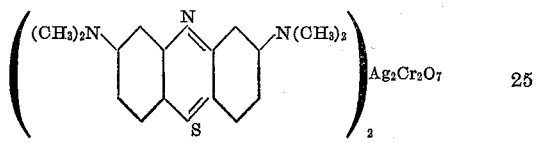

and exhibits antiseptic and therapeutic properties.

I am aware that numerous details may be varied through a wide range without departing from the principles of this invention, and I, therefore, do not purpose limiting the patent granted hereon otherwise than necessitated by the prior art.

Having now described my invention, and in what manner the same is to be performed, what I claim as new and desire to secure by Letters Patent, is:

1. The argeno-chrome double salt of tetramethylthionin.

2. The argento-chrome double salt of tetramethylthionin having the following probable formula:

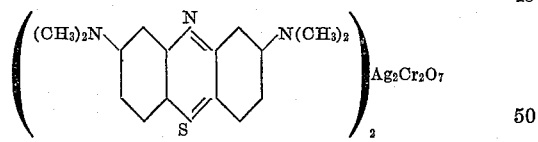

being, when crystallized from warm ethyl alcohol, an amorphous, reddish brown to purplish scale or powder having a bronzy, metallic luster, the compound being readily soluble in ammonia hydroxide, dilute nitric acid, hot glycerol, hot potassium iodide, warm alcohol, and warm acetone, is sparingly soluble in water, carbon tetrachloride, benzol, paraffin oil, and petrolatum, is not precipitated from solution by chlorides, but is thrown down as a canary yellow, curdy precipitate by lead acetate, and is not decolorized by reducing agents.

3. The process of manufacture, comprising coupling chromium and silver molecules to the zinc double salt of tetramethylthionin by dissolving the double zinc salt of tetramethylthionin in an acidulated silver nitrate solution, warming the mixture, adding thereto an aqueous solution of potassium dichromate, digesting the compound on a water-bath and recovering the precipitate.

4. The silver and chromium salt of tetramethylthionin having the following approximate percent composition: 21.33% silver, 10.31% chromium, 11.11% oxygen and 57.25% tetramethylthionin.

DAVID JULIAN BLOCK.